United States Patent
McGregor et al.

(10) Patent No.: US 6,756,561 B2
(45) Date of Patent: Jun. 29, 2004

(54) LASER CONSOLIDATION APPARATUS FOR MANUFACTURING PRECISE STRUCTURES

(75) Inventors: Gavin McGregor, London (CA); Mahmud-Ul Islam, London (CA)

(73) Assignee: National Research Council of Canada, Ontario (CA)

( * ) Notice: Subject to any disclaimer, the term of this patent is extended or adjusted under 35 U.S.C. 154(b) by 0 days.

(21) Appl. No.: 10/291,799

(22) Filed: Nov. 12, 2002

(65) Prior Publication Data

US 2003/0116542 A1 Jun. 26, 2003

Related U.S. Application Data

(63) Continuation-in-part of application No. 09/699,483, filed on Oct. 31, 2000, now Pat. No. 6,504,127, which is a continuation-in-part of application No. 09/408,853, filed on Sep. 30, 1999, now Pat. No. 6,269,540.

(51) Int. Cl.[7] ............................................. B23K 26/00
(52) U.S. Cl. ........................... 219/121.64; 219/121.63
(58) Field of Search ...................... 219/121.64, 121.63, 219/121.65, 121.66, 121.85, 121.78

(56) References Cited

U.S. PATENT DOCUMENTS

| | | | |
|---|---|---|---|
| 4,015,100 A | * | 3/1977 | Gnanamuthu et al. ...... 148/512 |
| 4,724,299 A | | 2/1988 | Hammeke |
| 4,807,814 A | | 2/1989 | Douche et al. |
| 4,863,538 A | * | 9/1989 | Deckard ...................... 264/497 |
| 5,038,014 A | | 8/1991 | Pratt et al. |
| 5,111,021 A | | 5/1992 | Jolys et al. |
| 5,352,405 A | * | 10/1994 | Beaman et al. ................ 419/45 |
| 5,418,350 A | | 5/1995 | Freneaux et al. |
| 5,477,026 A | | 12/1995 | Buongiorno |
| 5,615,980 A | | 4/1997 | Mauchle |
| 5,645,380 A | | 7/1997 | Rutz |
| 5,676,494 A | | 10/1997 | Ruch |
| 5,731,046 A | | 3/1998 | Mistry et al. |
| 5,837,960 A | * | 11/1998 | Lewis et al. ........... 219/121.63 |
| 5,855,149 A | | 1/1999 | Islam et al. |
| 5,873,680 A | | 2/1999 | Huber et al. |
| 5,961,858 A | | 10/1999 | Britnell |
| 6,203,861 B1 | | 3/2001 | Kar et al. |
| 6,504,127 B1 | | 1/2003 | McGregor et al. |
| 6,526,327 B2 | | 2/2003 | Kar et al. |

FOREIGN PATENT DOCUMENTS

CA 2215940 9/1997

* cited by examiner

Primary Examiner—M. Alexandra Elve
(74) Attorney, Agent, or Firm—Jones, Tullar & Cooper, PC

(57) ABSTRACT

A laser consolidation apparatus for manufacturing precise three dimensional structures disclosed. The apparatus comprises means for feeding a stream of material to an area on a surface to be built up, at an angle normal to the surface and means to direct a converging laser beam on the surface at an angle of 25 to 30° to the normal to the surface from a plurality of directions surrounding the material feed. Discrete mirror segments direct the laser beam on to movable plane mirrors producing reflected beams which combine to illuminate an area on the work surface.

9 Claims, 9 Drawing Sheets

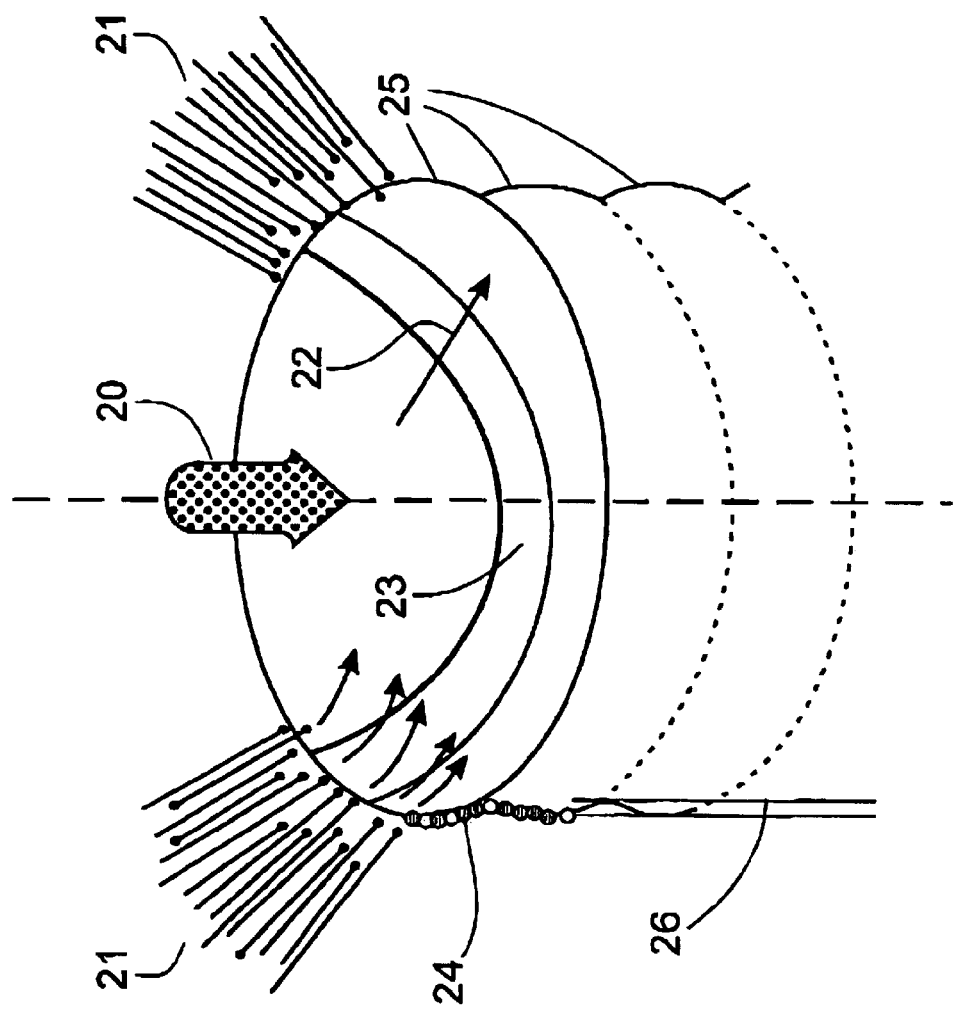
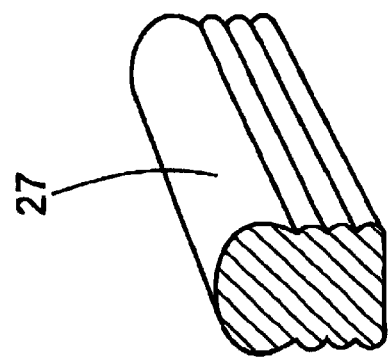
FIG. 1a (Prior Art)
FIG. 1b (Prior Art)

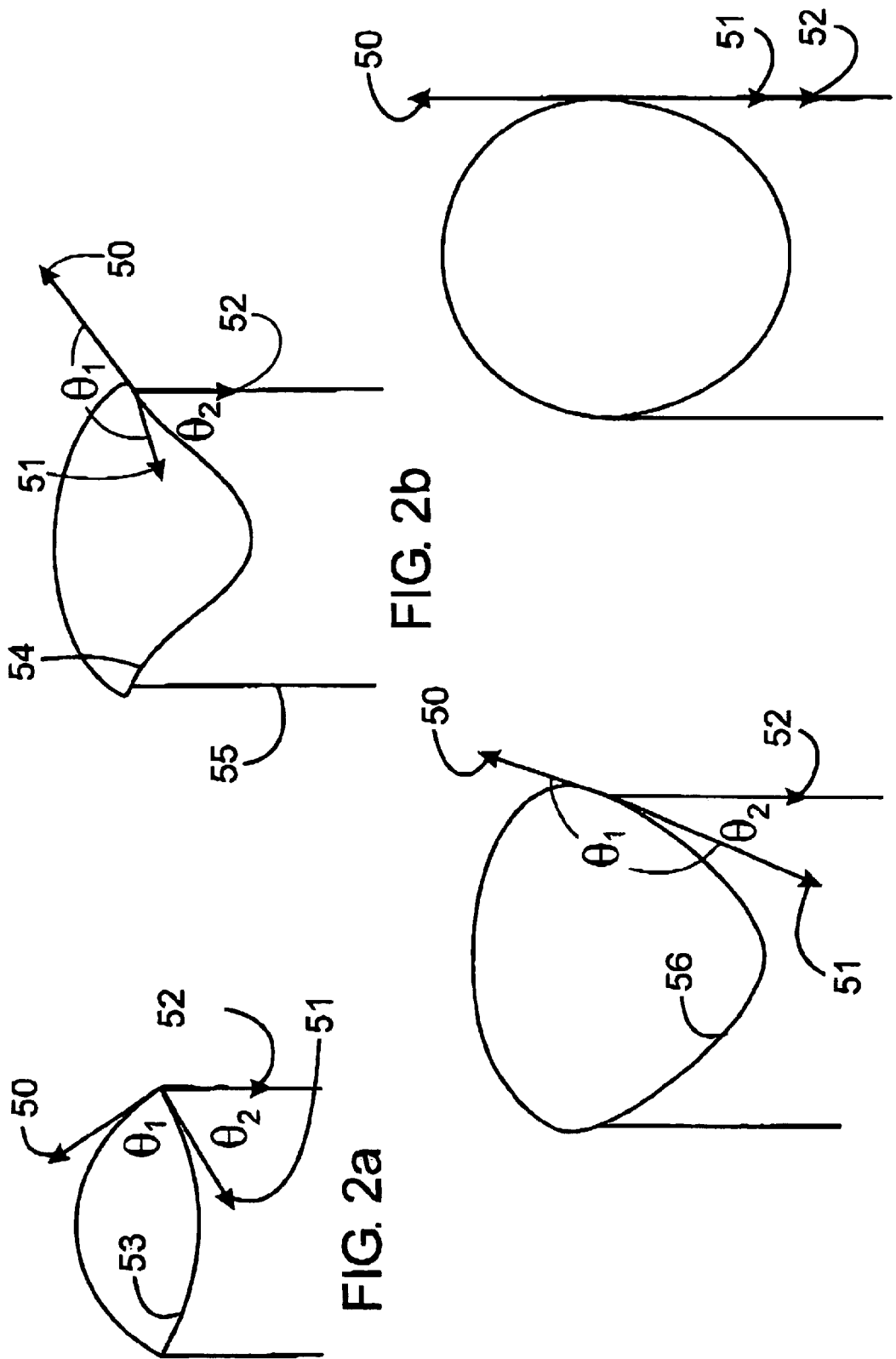

LASER CONSOLIDATION APPARATUS FOR MANUFACTURING PRECISE STRUCTURES

CROSS REFERENCE TO RELATED APPLICATIONS

This application is a continuation-in-part of application Ser. No. 09/699,483 filed Oct. 31, 2000 now U.S. Pat. No. 6,504,127 entitled "Laser Consolidation Methodology and Apparatus for Manufacturing Precise Structures" which is a continuation-in-part of application Ser. No. 09/408,853 filed Sep. 30, 1999 now U.S. Pat. No. 6,269,540 and entitled "Process for Manufacturing or Repairing Turbine Engine or Compressor Components".

STATEMENT REGARDING FEDERALLY SPONSORED RESEARCH/DEVELOPMENT

Not Applicable

BACKGROUND OF THE INVENTION

1. Field of the Invention

This invention relates to an apparatus for building precise 3D components and structures by a material addition process called laser consolidation, more particularly an arrangement for the vertical delivery of metallic powder, or wire into a precisely formed melt pool created in a substrate by laser beams having a specific angular orientation relative to the substrate.

2. Background Information

Rapid Prototyping (RP) is a related technique based on layered manufacturing where a part is built as a series of horizontal layers, each one being formed individually and bonded to the preceding layer. Various processes have been used differing in the way each layer is formed and the raw materials used but the underlying methodology is essentially the same in each case.

Stereolithography (SLA) and Selected Laser Sintering (SLS) are the two most common rapid prototyping processes. In both cases, a three dimensional CAD model of a part is generated and sliced into horizontal layers. The sliced files are used for tool path generation to make a solid part layer by layer. The thickness of each slice is controlled and is determined by the degree of accuracy required and the capability of the system, viz-a-viz the maximum thickness that can be cured or sintered by the specific process.

The SLA process uses a photosensitive monomer, which is cured layer by layer using an ultraviolet laser resulting in a cured polymer part. In the SLS process a carbon dioxide laser of appropriate power is used to scan across the surface of a bed of a powdered thermoplastic material, sintering the powder into the shape of the required cross-section. A major limitation of the SLS process is its inflexibility in the selection of metals that can be used. To generate metallic parts, thermoplastic coated metal powders are used to create a "green shape" of the component. The thermoplastic plastic is removed in a "burn-off" step and replaced by infiltrating a lower melting point metal.

In order to produce dense three dimensional metal/alloy parts, Los Alamos National Laboratory in the U.S. developed a process called "Directed Light Fabrication of Complex Metal Parts" (1994 ICALEO conference). In this process a coaxial powder delivery nozzle is used with a normal laser incident angle. The focussed laser beam enters a chamber along the vertical axis of the nozzle that also delivers metal powder to the focal zone. The deposition is done on a base plate, which is removed after the part is built. The powders used for part build-up are 316 stainless steel, pure tungsten, nickel aluminide and molybdenum disilicide.

In a paper presented at a "Rapid Prototyping and Manufacturing "96" conference (SME, Michigan, Apr. 23–25, 1996) Dave Keicher of Sandia National Laboratories dealt with "Laser Engineered Net Shaping (LENS) for Additive Component Processing". This process uses a Nd:YAG laser and a special nozzle arrangement for powder delivery. Four streams of powder are fed into a melt pool which is created and sustained by a central laser beam. It is pointed out that this arrangement avoids the situation in off-axis single side feed powder delivery system where there is a strong directional dependence. The symmetrical (quasi coaxial) arrangement permits uniform cladding independent of direction.

A rapid prototyping technique has also been used by Prof. W. Steen (1994 ICALEO conference paper). A machining pass is added after each build-up pass, and a high power carbon dioxide laser (>2 kw) is used. Optics for the beam delivery system are incorporated on an automatic tool changing system. The process requires that after each laser build-up pass, the metal layer is machined back to required dimensions, necessary because of a lack of control on the laser build-up. It was also found that a change in cladding direction has a significant influence on the shape and quality of the build-up. Good quality clad with a regular shaped bead was obtained parallel to the flow direction but as the angle to the flow direction increased the quality deteriorated until clad perpendicular to the flow was of poor quality. Machining is used to remove the imperfections in shape and size of each built up layer arising from the change in the clad direction. As side nozzle powder delivery builds unevenly in various directions in the xy-plane, the additional required step of machining after each deposition pass makes the process cumbersome and expensive. As the control on the build-up process is poor, most of the material is removed to maintain the geometry creating unnecessary waste of expensive material.

It is evident from the above that in building up metal parts using a carbon dioxide or Nd:YAG laser and metallic powder, single nozzle side delivery always involves a directional dependence, and is either abandoned in favour of coaxial powder delivery or machining is employed after every pass to maintain dimensions. The trend is to use a coaxial powder delivery to obtain equal layer build-up in all directions. In addition it is apparent that the incident laser beam is always normal to the surface of the base plate.

Several nozzle designs for coaxial powder feeding during laser cladding have been disclosed, for example: U.S. Pat. No. 4,724,299 (Hammeke, Feb. 9, 1988); U.S. Pat. No. 5,418,350 (Freneaux, May 23, 1995); U.S. Pat. No. 5,477,026 (Buongiorno, Dec. 19, 1995) and U.S. Pat. No. 5,111,021 (Jolys, May 5, 1992).

U.S. Pat. No. 5,731,046 to Mistry (Mar. 24, 1998) discloses a technique for fabricating diamond and diamond-like coatings on a substrate. Mistry also discloses that complex shapes can be fabricated as coating structures on the surface of the substrate. Mistry discloses using a plurality of lasers each having different and specific temporal and spectral characteristics to perform the following functions: one laser to ablate the constituent element, a second to initiate chemical reaction, and a third to provide overall thermal balance. Mistry discloses that shaped coatings can be made on the surface of the substrate by the relative movement of the laser system and the substrate. Ministry does not teach the importance of the critical angle of the lasers relative to the powder feed nozzle, the symmetrical arrangement of the laser beams relative to the material feed system nor the control over and the shape of the melt pool required to make precise structures and components with smooth walls.

The inventors' U.S. Pat. No. 5,855,149 (Canadian application 2,242,082 published Dec. 30, 1999) teaches a method of producing a sharpened edge on a cutting die by having a laser beam or beams impinge on a base surface at an angle to the normal of between 5° and 45° to fuse successive thin layers forming a metal ridge to the cutting edge. The inventors' Canadian application No. 2,215,940 published Mar. 23, 1998 discloses an apparatus and method for material disposition on a surface using a laser beam or beams impinging on the surface at an angle to the normal of between 5° and 45°.

Generally laser based material addition processes rely on focussing a laser beam to create a small molten zone in a suitable starting material (substrate). New material, usually in powder form, is added and melted to increase the volume of the molten zone. When the laser is shut off, or moved to a new location, the molten material rapidly cools and solidifies. When the process is sustained by moving the laser and material addition system across the substrate, at a controlled speed, it is possible to make a uniform ridge. The ridge can take on geometric forms when the laser and powder feed systems are moved across the substrate by following a predetermined path as described by a computer numerically controlled system. By repeating the operation using the original ridge as a new substrate, eventually after subsequent layers are added, a walled structure is formed.

All of the processes reported, can be described as near net shape. For example, Sandia National Laboratories, using their Laser Engineered Net Shape (LENS™) process, can produce parts with complex shapes having surface finishes that resembles a fine sand casting and having dimensional tolerances at best of +/−100 microns. To obtain better dimensional control and surface finishes requires secondary operations.

The arrangements commonly used in the prior art as illustrated in FIG. 1 of the drawings have a central laser source 20 with powder 21 entering symmetrically from the sides around the circumference. In this way the relationship to the pool remains the same regardless of the wall path. The arrangement is symmetrical but powder entering from the sides causes thermal and viscosity gradients 22, leading to incomplete melting where the wall surfaces are forming. Line 23 indicates the boundary of the molten zone. Unmelted or partially melted particles of powder 24 tend to stick on the surface as the wall is cooling. Attempting to correct the situation by adding more energy is not successful because the surface where the energy enters starts to evaporate causing a plasma to form which absorbs the incoming laser energy. The mass of "soupy" unmelted material in the vicinity of sides of the wall tends to slump outside the dimensions of the pool. Subsequent passes, or layers, applied in this slumped condition result in a wall where each layer has a convex curved surface 25. These curves at the surfaces of the layers produce variations in the wall thickness 26. The resultant wall has the appearance similar to 27 shown in FIG. 1a.

The practice of making precise structures in the prior art is to form a rough shape then use a material removal operation such as machining to create the final shape and surface finish. The present application describes a methodology and apparatus for making precise structures, for example, in the form of shells, in one operation.

When a focused laser is used to rapidly melt a zone in a substrate, and the zone is cooled quickly, the surface of the solidified zone is smooth. When the melting takes place in a non-oxidizing, dust and vibration free environment, and the molten zone is maintained close to the flow temperature of the substrate material, sub-micron finishes can be obtained on the solidified surface. If the melting process is controlled it is possible to get high quality surface finishes.

When material is added and melted into the melt pool, to increase its volume, it is more difficult to maintain a smooth finish. The problems with existing state of the art near net shape processes that feed powder into the pool from the sides stem from the thermal, and hence viscosity gradients, created in the pool and from powder particles sticking to the side walls as the pool solidifies.

SUMMARY OF THE INVENTION

In the Invention

Laser energy enters the molten pool at an angle of about 30 degrees to the vertical and symmetrically around the pool in the form of an annulus. Powder is injected vertically at the top dead centre of the melt pool through a fine nozzle.

The Advantages Are:

In forming the pool of molten material, energy enters symmetrically around the pool allowing the temperature to rise uniformly and rapidly avoiding local evaporation or the creation of serious thermal gradients within the pool.

Surface tension is maintained uniformly around the pool and hence results in a pool with a surface that is close to hemispherical in shape.

The temperature of the pool in the regions where the walls will form is uniform from side to side and is controlled above the melt temperature so that all the powder is completely melted. Thus the walls formed on cooling have a precise width and the surfaces are smooth. There are no visible or metallurgical discontinuities to show that the structure has been formed in a series of passes.

Directing the powder into the pool at the top ensures a high capture rate of powder and any stray particles are directed through the incoming beam and away from the solidifying wall surfaces.

The symmetry of the total system permits the substrate to be moved in any direction relative to the laser powder feed arrangement without changing the thermal balance within the melt pool.

The apparatus of this invention meets the criteria for making precise walls. However, in practice there may be a need to make minor adjustments in wall thickness. A fixed focus rigid 360 degree focussing mirror precludes any adjustment.

Variations in the apparatus are disclosed which permit fine adjustments. Specifically, the invention relates to apparatus for deposition and machining of an article comprising: a laser, focussing means producing a convergent beam from the laser, and reflecting means defining a path resulting in the focal point of the beam being positioned close to a work surface. The focussing means is adapted for movement whereby the focal point can be moved above and below the work surface for improved precision.

In another aspect the invention relates to apparatus for deposition and machining of an article comprising: a laser, focussing means producing a convergent beam from the laser and means adapted for movement of the focussing means to vary the position of the focal point of the beam. A beam splitter and reflective means define paths for the split beams to impact on a work surface. The reflective means includes a plane reflecting surface adapted for movement in a direction to alter the length of the paths. When the beams overlap on the work surface they produce an area of enhanced energy useful for cutting, welding or machining.

BRIEF DESCRIPTION OF THE DRAWINGS

The foregoing, and additional objects, features, and advantages of the present invention will become apparent to those of skill in the art from the following detailed description of preferred embodiments thereof, taken with the accompanying drawings, in which:

FIG. 1 Is a schematic diagram showing sources of dimensional inaccuracy and surface roughness in prior art equipment.

FIG. 2 Contains schematic diagrams illustrating surface tension forces.

DESCRIPTION OF THE INVENTION

Figure 3:
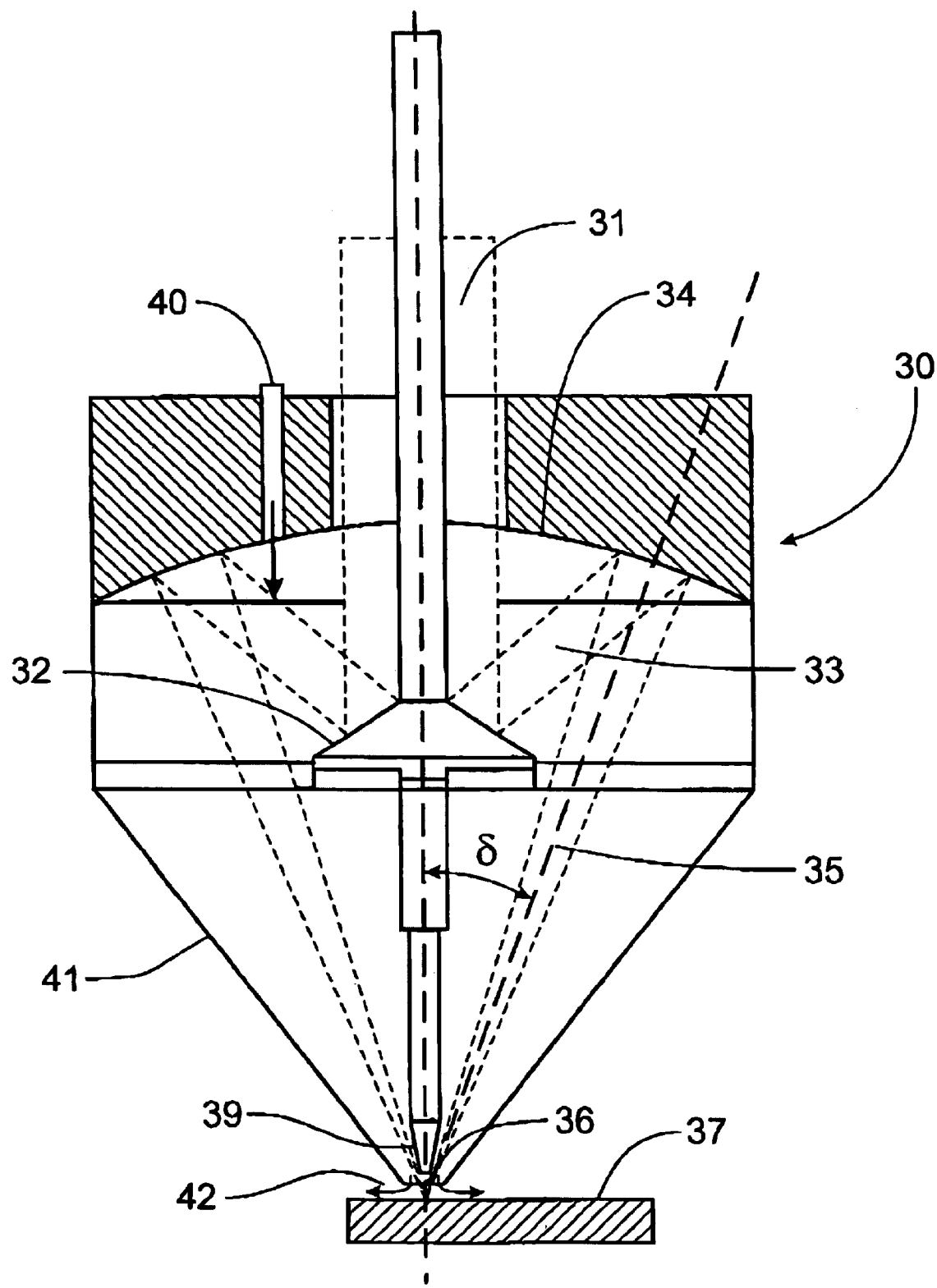
FIG. 3 Shows a cross-sectional view of 360° focussed laser beam consolidator.

In building components using the laser consolidation process, the shape and position of the liquid to vapour and the liquid to solid surface tension interfaces are critical.

Using the consolidation process to create precise structures with smooth sides, requires the volume of molten material to be as close to spherical as possible where the diameter of the sphere is equal to the thickness of the wall under construction. It follows that the process depends on being able to control the diameter and location of the sphere.

It is well known that when a liquid body is free to do so, it minimizes its energy content by assuming a spherical shape. This is the shape that has the least surface area to volume. In practice this is difficult to attain. One example, is when a liquid freezes during a free fall, such as in forming lead shot. It is also possible using the controlled conditions of the consolidation process to create essentially a spherically shaped volume of molten material.

From a theoretical point of view, to attain vertical and smooth side wall construction, requires the shape of the molten surface exposed to the atmosphere to be essentially hemispherical. It is equally important that the portion of the molten zone cradled within the substrate is also essentially hemispherical, so the total molten volume is spherical. This spherical condition results in a smooth vertical transition as each pass of material is added. In the spherical condition the components of surface tension, liquid to solid ($\gamma$Ls), liquid to vapour ($\gamma$Lv) and solid to vapour ($\gamma$Sv) are balanced. Various models of melt pool configurations are shown in FIG. 2, in which this balance is not maintained and where material slumping is experienced. Slumping is caused by the mass of added material overcoming the surface tension force's effort to form a sphere.

To aid in achieving the total spherical shape it is necessary to create within the wall, or substrate, a cradle which is essentially hemispherical to support the liquid. It has been found experimentally that the molten material has to be cradled in such a way that the liquid to solid surface tension interface (Ls) blends smoothly and vertically into the liquid to vapour surface tension interface (Lv). Since there are no angular forces in this condition the surface tension force system can be expressed as $\gamma Lv = \gamma Ls + \gamma Sv$. Because the consolidation process forms a cradle with a sharp edge at the wall surface, $\gamma Sv$ is negligible, thus $\gamma Ls = \gamma Lv$ which is what one would expect in a perfect sphere. If the smooth vertical blend is not achieved some form of aberration will occur in the forming side wall.

The applicants have found that to create a suitable support cradle the entry angle of the laser beam has to be between 25–30 degrees to the vertical. It may be possible to use smaller angles but practical limitations imposed by the powder feed system prevented exploration of this logical possibility. Increasing the angle produces shallower cradles and an imbalance in the surface tension force system resulting in discontinuities in the wall surfaces.

FIG. 2 illustrates surface tensions components for various systems. In FIGS. 2a, 2b, 2c, 2d the liquid-to-vapour interface (Lv) is represented by arrow 50, the liquid-to-solid interface (Ls) is represented by arrow 51 and the solid-to-vapour interface (Sv) is represented by arrow 52. In all of the conditions shown in FIGS. 2a, 2b, 2c (representing prior art) the surface tension components have angular relationships to each other and can be expressed as $\gamma Lv + \gamma Ls \cos \theta_1 + \gamma Sv \cos \theta_2 = 0$, where $\theta_1$, $\theta_2$ represent the angular relationships between the surface tension components.

In FIG. 2a (prior art) the shallow cradle 53 limits the build up capacity because of the onset of slumping, or overflowing. In FIG. 2b (prior art) the laser energy distribution has created shallow areas 54 near the sidewalls and is unable to support the build up of material. In FIG. 2c (prior art) the deeper cradle 56 improves the build capacity, but the surface tension forces in attempting to attain a spherical form cause the material to bulge 57 resulting in poor dimensional control and undulating surfaces. In FIG. 2d (representative of the present invention), the hemispherical cradle allows material to build up such that the surface tension components 50, 51, 52 at the point of maximum build up are vertically aligned and thus surface tension is able to form a spherical pool.

FIG. 3 shows a 360 degree focussed laser beam consolidator 30. A low energy density expanded laser beam 31 enters at the top of the consolidator 30. The laser beam is reflected by a conical mirror 32 forming a divergent hollow conical beam 33 which impinges on a 360 degree spherical mirror 34. The spherical mirror reflects the hollow conical beam in the form of a convergent hollow cone 35 and focuses the energy in an annular pattern 36 on the substrate surface 37. The angle $\delta$ that the converging beam makes with the vertical axis of the system is 30 degrees. The diameter of the melt pool made by the annular ring of energy determines the wall thickness of the structure to be built. A powder feed tube 38 passes through the centre of the low energy density incoming laser beam and through the centre of the conical mirror and terminates in a precision powder feed nozzle 39 positioned directly above the melt pool. Powder is propelled through the powder feed tube and injected from the nozzle into the centre of the melt pool. Additionally the consolidation system features a gas purge system 40 to keep the mirrors clean and as the gas exists from the nozzle of the protective cone 41 provides a cover gas 42 over the melt pool that inhibits oxidation.

Figure 4B:
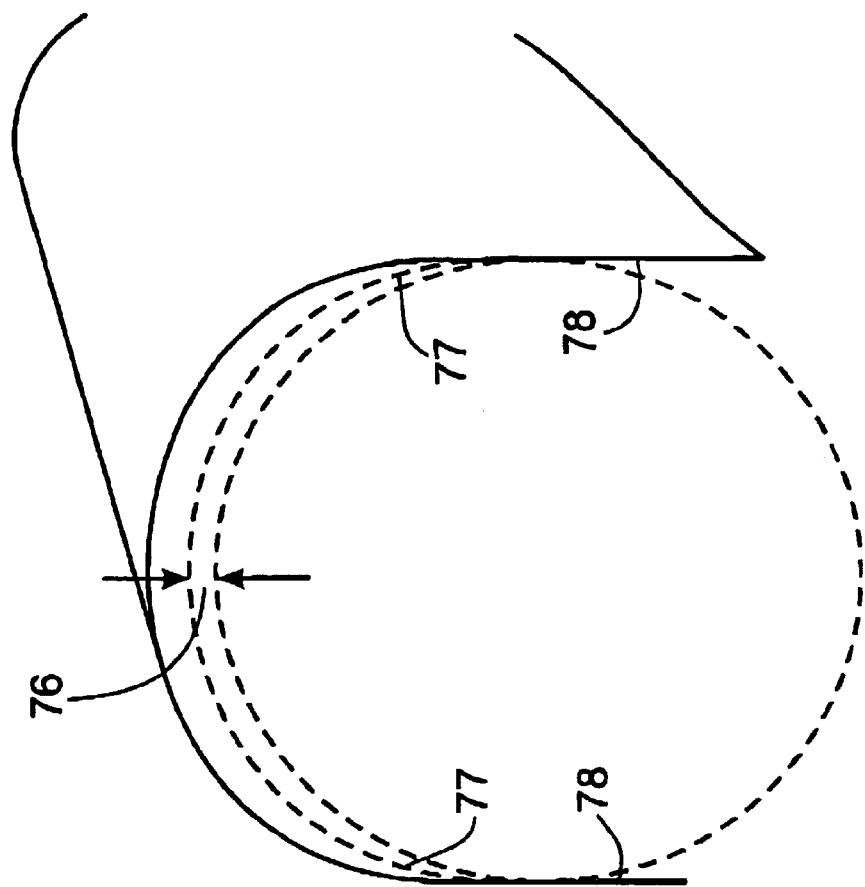
FIG. 4 Shows the direction and arrangement of laser beams and powder feed.
Figure 4A:
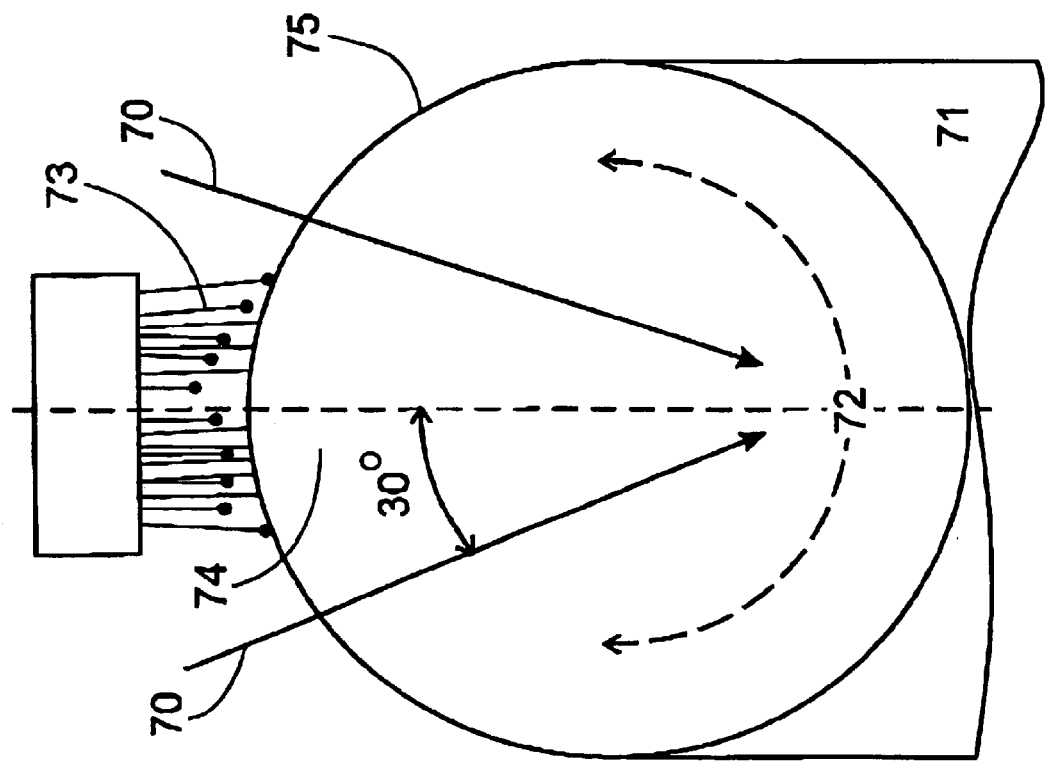

FIGS. 4a and 4b illustrate the arrangement for the delivery of energy and powder. Laser energy 70 enters the substrate material 71 symmetrically in an annular pattern from several directions up to a full 360 degrees at an angle of 30 degrees to the normal of the substrate surface, or vertical axis. The cumulative effect of the energy in the beams creates within the substrate a hemispherical pool of molten material 72, the viscosity of the molten material is relatively constant throughout the pool. A controlled stream of powdered material 73 is injected into the top of the molten pool 74. The volumetric rate of material entering the pool is critical to ensure that the mass of the increased height is balanced against the ability of the surface tension force to maintain the spherical shape 75 of the pool. Subsequent passes are required to build-up a wall of material. The height of each pass 76 is small and consistent with the balancing of surface tension against gravity. Because the region close to the edge 77 is kept in a molten state, the surface tension in the material is able to maintain the verticality of wall between passes. Because of the small mass of molten material, relative to that of the substrate, the material solidifies quickly leaving a smooth surface 78 and a fine grained metallurgical structure in the material.

By replacing the conical mirror shown in FIG. 3 with a multifaceted pyramidal mirror, a number of beamlets equal to the number of facets will be reflected on to the concave spherical mirror. The beamlets are then focussed by the spherical mirror to form an annulus of energy in the melt pool that is similar to the 360 degree arrangement shown in FIG. 3. The multi-beamlet arrangement has the advantage of providing space for the powder feeder or sensors to enter between the beamlets, and thereby simplify the construction of the consolidation system.

Figure 5:
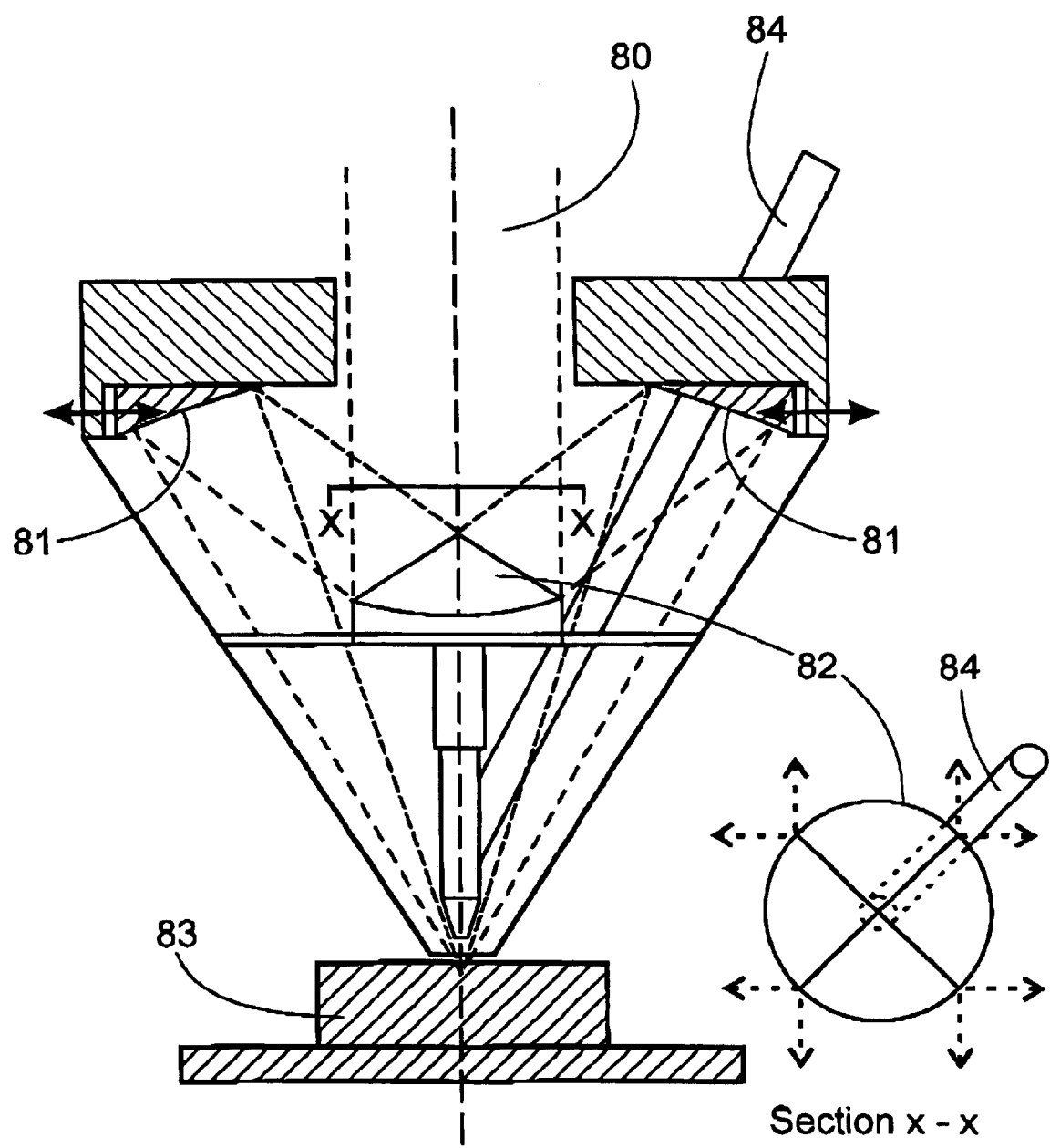
FIG. 5 Shows a cross-sectional view of the apparatus using a pyramidal mirror.

In the multi-beamlet configuration individual mirrors for each beamlet can replace the single spherical mirror FIG. 5. The incoming beam 80 is split into four beamlets by the four sided pyramidal mirror 82. The four beamlets with D-shaped cross-sections are reflected towards the individual mirrors 81 that have a concave spherical surface. The beamlets in turn are reflected and focussed onto the substrate 83. The individual mirrors can be moved horizontally so that the axis of the focussed beamlet is shifted laterally in, or out. This lateral adjustment is used to change the melt pool diameter and hence the thickness of the part being produced. The amount of movement is small, in the order of 13 microns (0.0005") and the focussing angle is kept at 30 degrees. The arrangement also shows the powder feed tube 84 entering the system between the beamlets and connecting to the injection nozzle below the pyramidal mirror.

It is further possible to reduce the number of facets on the splitter mirror to two, that is, a wedge rather than a cone. This two-beamlet arrangement produces less precise parts, as the energy distribution in the D-shaped beamlets is not completely uniform during directional changes.

The two-beamlet arrangement is capable of producing a nominal wall thickness controlled to +/−25 microns and surface finishes better than 2 microns Ra.

Figure 6:
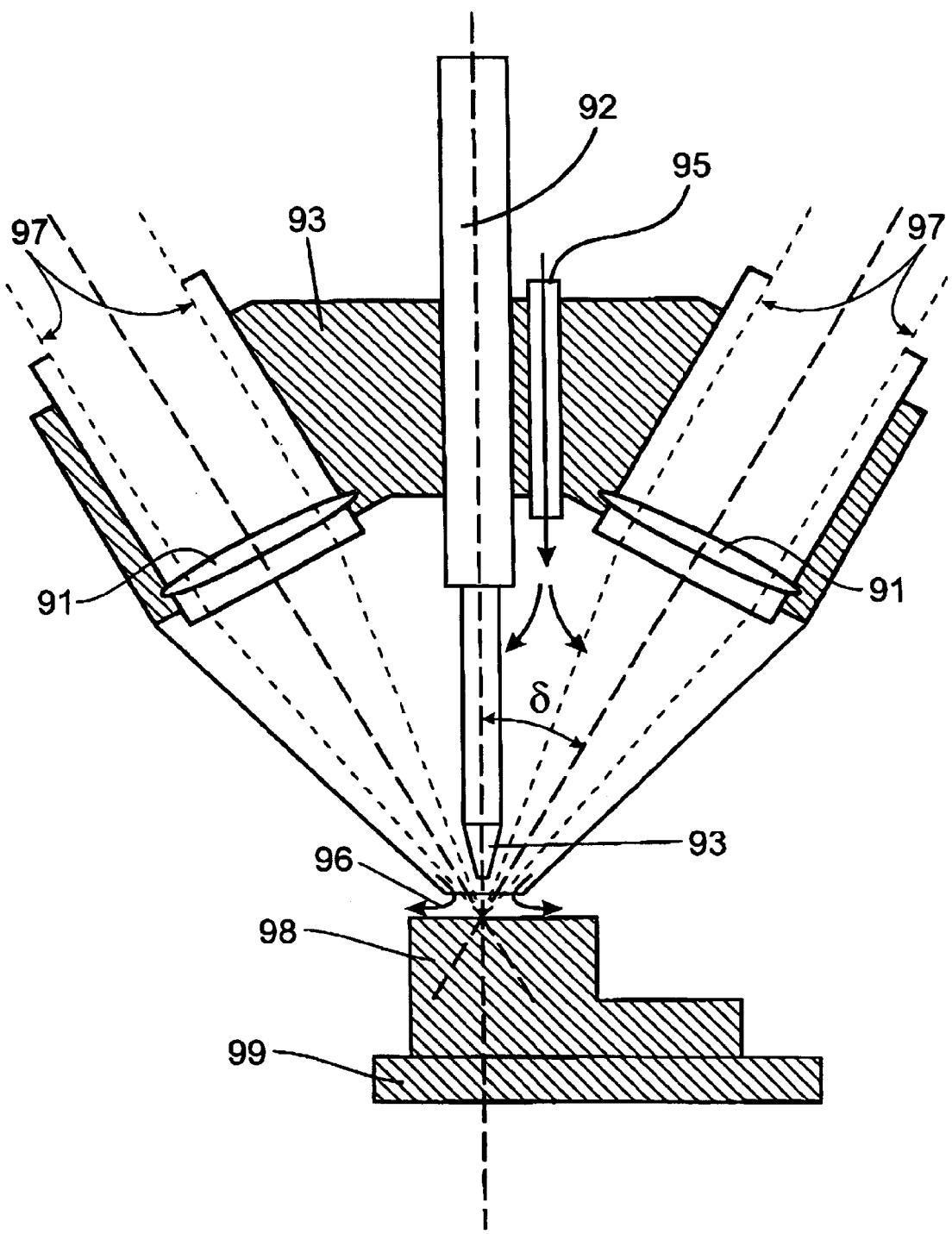
FIG. 6 Shows a cross-sectional view of apparatus using lenses.

Standard optics can be used to perform in a similar manner to the multi-beamlet approach, such as that shown in FIG. 6. This apparatus employs lenses 91 positioned to focus supplied laser beams at the desired focussing angle δ of 30 degrees. The powder feed system is directly vertical 92. The optics and the powder feed system are accurately position in a rigid body 93 that can also support a protective feed cone 94 and an inert gas cover purge and system 95 and 96. The number of beams that can be physically accommodated is limited in this design. Energy 97 may be supplied to the focussing lenses through fibre optic delivery systems commonly used with Nd:YAG lasers. A structure 98 is shown being built on an original substrate 99.

Figure 7:
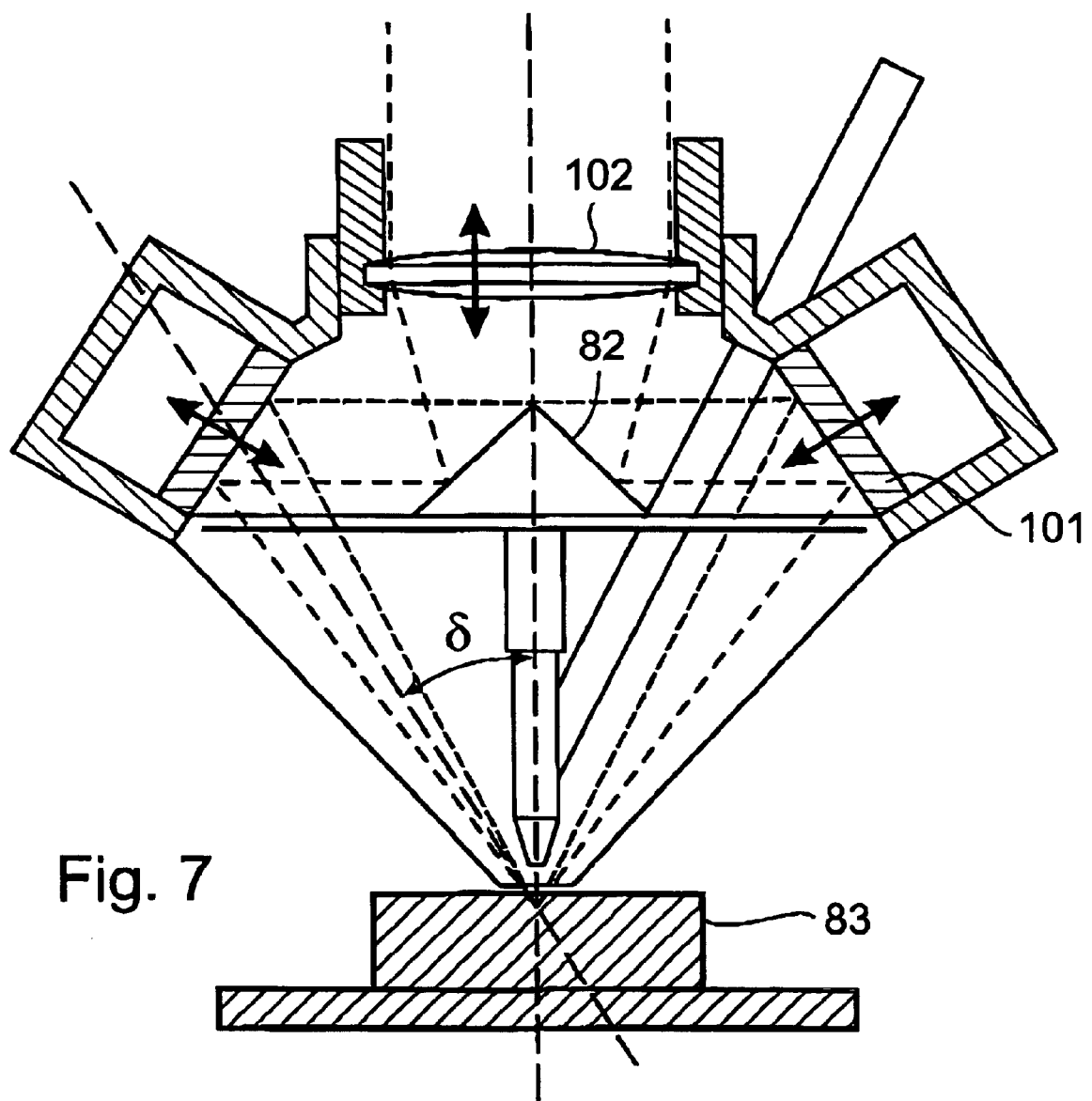
FIG. 7 Shows a variation of the apparatus shown in FIG. 5 using plane rather than spherical reflectors, FIG. 8 Shows the beam paths in the apparatus of FIG. 7 when the focussing lens is moved, and FIG. 9 Shows the beam paths in the apparatus of FIG. 7 when the plane reflecting mirrors are moved.

FIG. 7 illustrates a modification of the apparatus shown in FIG. 5 in which the spherically mirrored sections 81 are replaced by movable plane mirrors 101. A movable focussing lens 102 is provided in the path of the laser beam prior to the beam impacting on the flat faceted surfaces of the reflector 82, which as shown is pyramidal-shaped.

Figure 8:
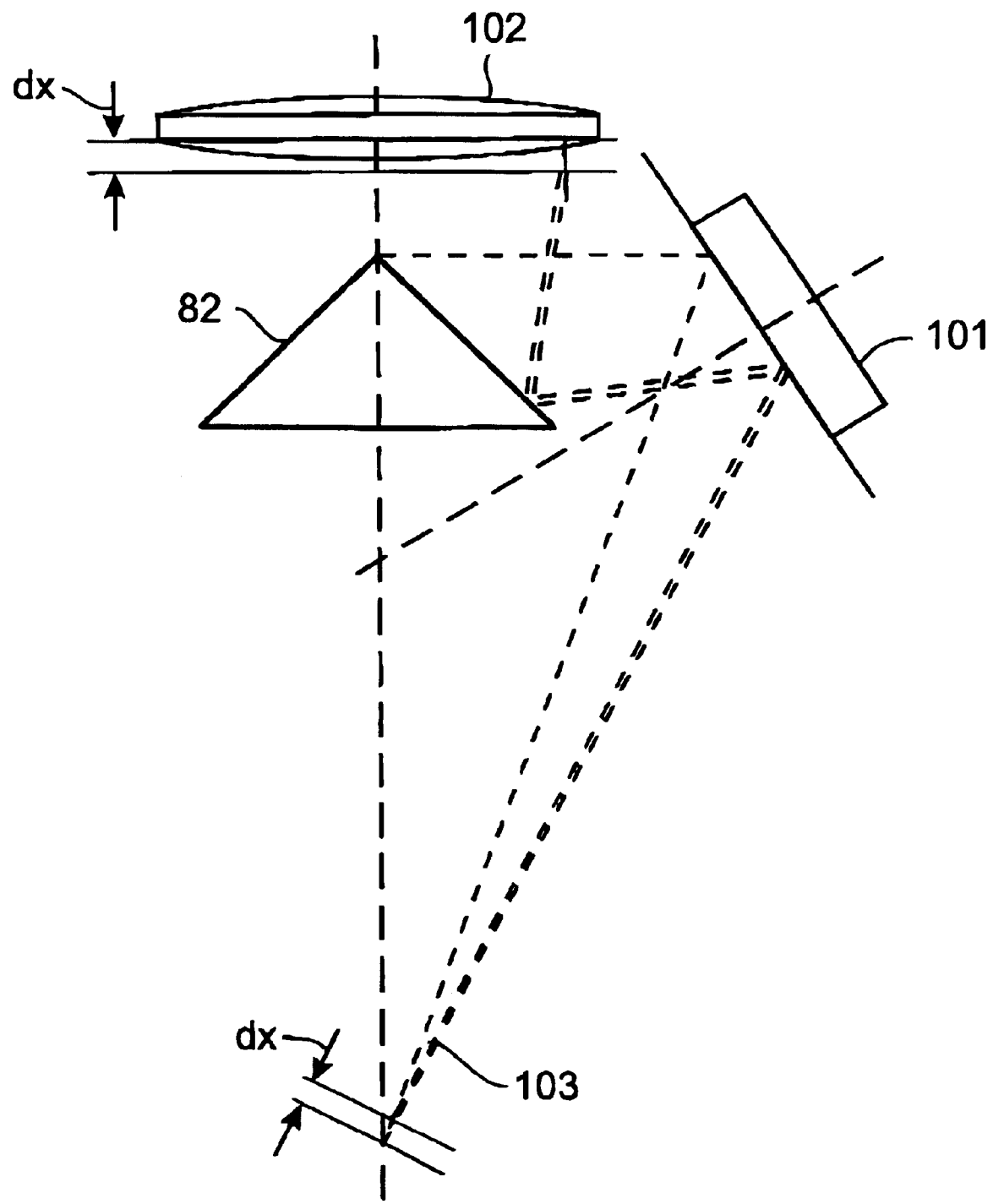
Figure 9:
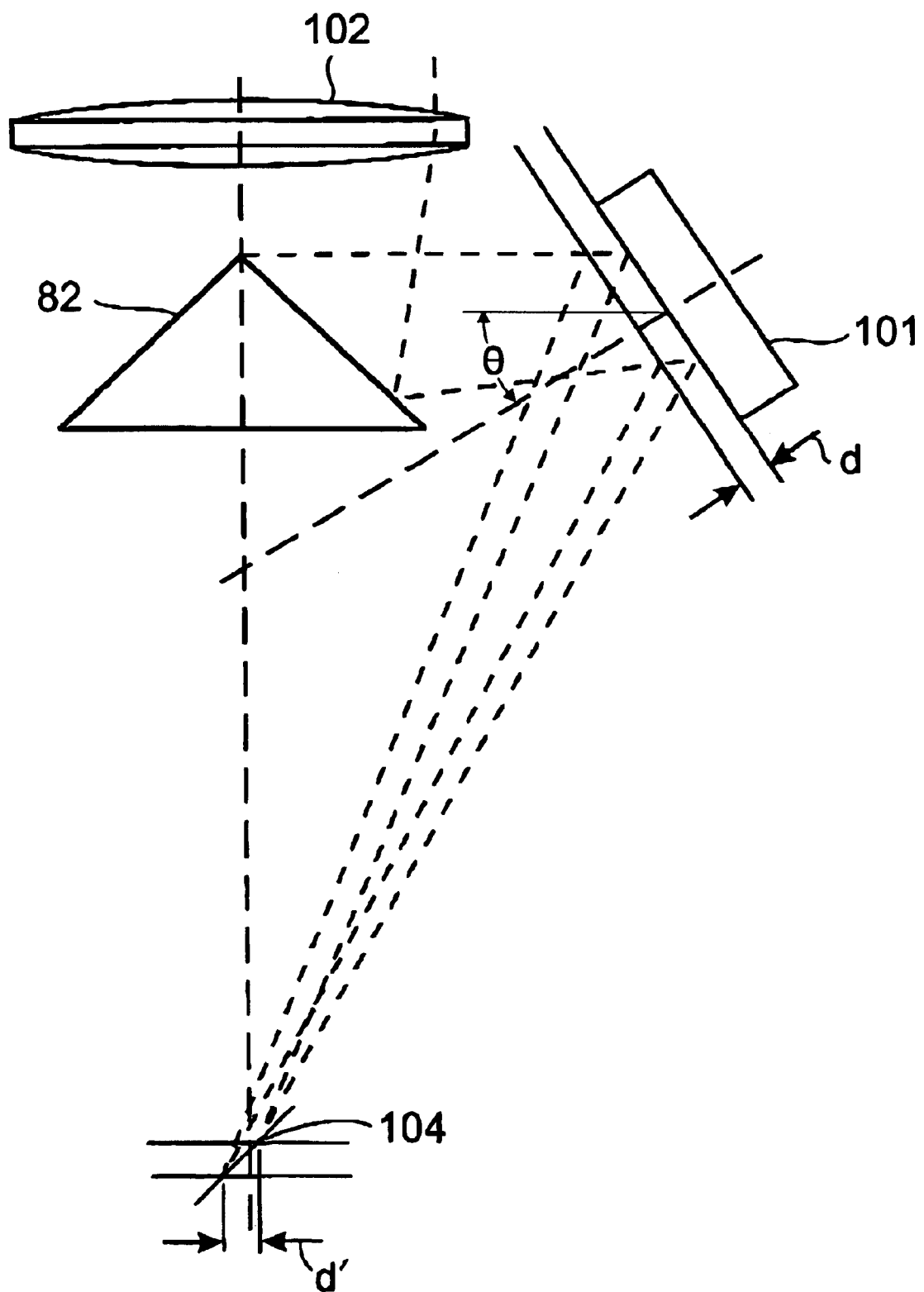

Movement of the focussing lens 102 results in movement of the focal point of the beam 103 above and below the work surface, as is shown in the ray diagram of FIG. 8. A dx displacement of the lens 102 leads to a similar displacement of the focal point. Movement of the reflecting plane mirror 101 results in sideways displacement of the beam with respect to the work surface as shown at 104 in the ray diagram of FIG. 9. A displacement d in the mirror 101 leads to a slightly larger lateral displacement d' of the focal point, where d'=2d cos θ. This arrangement provides improved control with a structure less complex than that shown in FIG. 5. Although the movement of mirrors 101 is shown as being perpendicular to their planar surface, which facilitates control thereof, it will be appreciated that the movement could be lateral or radial with respect to the central axis of the apparatus.

A further advantage of the apparatus of FIG. 7 is that it is possible to have the separate beams overlap originating at the beam splitter on the work surface thereby producing increased intensity which is useful for cutting, welding and machining.

It will be clear to persons skilled in the art, that other numbers of beams could be used and would fall within the scope of this invention. It will also be clear to those skilled in the art that materials other than powdered metal could be used and that other forms of material such as wire could be used in the material feed without deviating from the scope of the present invention.

What is claimed is:

1. Apparatus comprising:

a material feed extending normally to a work surface;

a laser;

focusing means producing a convergent beam from said laser, said beam being at an angle of 25° to 30° to the normal with respect to said work surface to produce an annular pattern on the work surface substantially surrounding the material feed;

reflective means defining a path for said beam to impact on a work surface;

the reflective means including a plane reflecting surface adapted for movement in a direction to alter the length of the path to vary the position of impact of the beam on material supplied to the work surface, whereby the material is melted and maintained in molten spherical configuration by surface tension.

2. Apparatus comprising:

a material feed extending normally to a work surface;

a laser;

focusing means producing a convergent beam from said laser, said beam being at an angle of 25° to 30° to the normal with respect to said work surface to produce an annular pattern on the work surface substantially surrounding the material feed;

reflective means defining a path resulting in the focal point of said beam being positioned close to said work surface;

means adapted for movement of the focusing means whereby the focal point is moved above and below said work surface;

whereby the material is melted and maintained in molten spherical configuration by surface tension.

3. Apparatus for deposition of layers of material on a work surface, comprising:
- a material feed extending normally to the work surface;
- a laser;
- focusing means producing a convergent beam from said laser, means adapted for movement of the focusing means to vary the position of the focal point of the beam;
- means splitting said beam including reflective means defining paths for the split beams to impact on a work surface, the reflective means including a plane reflecting surface adapted for movement in a direction to alter the length of the paths, each of the beams being at an angle of 25° to 30° to the normal with respect to the work surface;
- whereby the beams overlap on the work surface producing an area of enhanced energy and the material is melted and maintained in molten spherical configuration by surface tension.

4. The apparatus of claim 1, further including means of splitting said beam to provide split beams, said reflective means defining paths for the split beams to impact on the work surface.

5. The apparatus of claim 4, wherein said reflective means is movable to precisely control the position of the split beams on the work surface.

6. The apparatus of claim 2, wherein the material feed is a powder feed.

7. The apparatus of claim 1, wherein the material feed is a powder feed.

8. The apparatus of claim 3, wherein the material feed is a powder feed.

9. The apparatus of claim 3, wherein said beams produce an annular pattern on the work surface substantially surrounding the material feed.

* * * * *